(12) United States Patent
Gao et al.

(10) Patent No.: US 12,425,588 B2
(45) Date of Patent: Sep. 23, 2025

(54) CCSO WITH DOWNSAMPLING FILTERS AND SAMPLE POSITION SELECTION

(71) Applicant: Tencent America LLC, Palo Alto, CA (US)

(72) Inventors: Han Gao, Palo Alto, CA (US); Xin Zhao, Palo Alto, CA (US); Liang Zhao, Palo Alto, CA (US); Jing Ye, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/660,067

(22) Filed: May 9, 2024

(65) Prior Publication Data

US 2025/0119538 A1  Apr. 10, 2025

Related U.S. Application Data

(60) Provisional application No. 63/543,273, filed on Oct. 9, 2023.

(51) Int. Cl.
*H04N 7/12* (2006.01)
*H04N 19/117* (2014.01)
*H04N 19/124* (2014.01)
*H04N 19/132* (2014.01)
(Continued)

(52) U.S. Cl.
CPC ......... *H04N 19/117* (2014.11); *H04N 19/124* (2014.11); *H04N 19/132* (2014.11);
(Continued)

(58) Field of Classification Search
CPC .................................................. H04N 19/117
See application file for complete search history.

(56) References Cited

U.S. PATENT DOCUMENTS

2018/0124400 A1  5/2018  He et al.
2018/0160134 A1  6/2018  Zhang et al.
(Continued)

FOREIGN PATENT DOCUMENTS

WO   WO 2022040428 A1   2/2022

OTHER PUBLICATIONS

Tencent America LLC, ISR/WO, PCT/US2024/030273, Aug. 26, 2024, 12 pgs.
(Continued)

*Primary Examiner* — Y Lee
(74) *Attorney, Agent, or Firm* — Morgan, Lewis & Bockius LLP

(57) ABSTRACT

Various implementations described herein include methods and systems for coding video. In one aspect, a video bitstream includes a current image frame and a first syntax element. An electronic device determines that the first syntax element has a first predefined value indicating that the cross-component sample offset (CCSO) mode is enabled, and generates a set of adapted luma samples including an adapted first luma sample and its adapted neighboring luma samples based on a set of reconstructed luma samples. The reconstructed luma samples include a first luma sample that is collocated with a first color sample. The electronic device determines the first sample offset of the first color sample based on the adapted first luma sample and the one or more adapted neighboring luma samples. The current image frame is reconstructed at least by adjusting the first color sample based on the first sample offset.

23 Claims, 7 Drawing Sheets

(51) Int. Cl.
  *H04N 19/159* (2014.01)
  *H04N 19/167* (2014.01)
  *H04N 19/172* (2014.01)
  *H04N 19/184* (2014.01)
  *H04N 19/186* (2014.01)
  *H04N 19/593* (2014.01)
  *H04N 19/70* (2014.01)
  *H04N 19/82* (2014.01)

(52) U.S. Cl.
  CPC ......... *H04N 19/159* (2014.11); *H04N 19/167* (2014.11); *H04N 19/172* (2014.11); *H04N 19/184* (2014.11); *H04N 19/186* (2014.11); *H04N 19/593* (2014.11); *H04N 19/70* (2014.11); *H04N 19/82* (2014.11)

(56) References Cited

U.S. PATENT DOCUMENTS

| | | |
|---|---|---|
| 2022/0030271 A1 | 1/2022 | Li et al. |
| 2022/0182635 A1 | 6/2022 | Li et al. |
| 2022/0272336 A1 | 8/2022 | Tourapis |
| 2022/0337847 A1 | 10/2022 | Chen et al. |
| 2022/0368928 A1 | 11/2022 | Ma et al. |
| 2023/0143151 A1 | 5/2023 | Krishnan et al. |
| 2023/0319315 A1 | 10/2023 | Kuo et al. |
| 2023/0336748 A1 | 10/2023 | Ye et al. |

OTHER PUBLICATIONS

Tencent America LLC, ISR/WO, PCT/US2024/030397, Aug. 28, 2024, 17 pgs.

Tencent America LLC, ISR/WO, PCT/US2024/030268, Jul. 9, 2024, 17 pgs.

Che-Wei Kuo et al., "Cross-Component Sample Adaptive Offset", 2022 Data Compression Conference (DCC), Mar. 2022, 10 pgs., Retrieved from the Internet: https://ieeexplore.ieee.org/abstract/document/9810701.

Xin Zhao et al., "Study on Coding Tools Beyond AV1", 2021 IEEE International Conference on Multimedia and Expo (ICME), Jul. 2021, 6 pgs., Retrieved from the Internet: https://ieeexplore.ieee.org/abstract/document/9428244.

Yixin Du et al., "Cross-Component Sample Offset for Image and Video Coding", 2021 International Conference on Visual Communications and Image Processing (VCIP), Dec. 2021, 5 pgs., Retrieved from the Internet: https://ieeexplore.ieee.org/abstract/document/9675355.

Han Gao et al., "Wedge Mode Extensions", Alliance for Open Media, Codec Working Group, Document: CWG-C092_v1, Dec. 2022, 4 pgs.

Peter de Rivaz et al., "AV1 Bitstream & Decoding Process Specification", Version 1.0.0 with Errata 1, Alliance for Open Media, Jan. 2019, 681 pgs.

Xin Zhao et al., "CWG-B099: Improved CCSO with Luma Extension and Band Feature", Alliance for Open Media, Codec Working Group, Jan. 2022, 5 pgs.

CCSO WITH DOWNSAMPLING FILTERS AND SAMPLE POSITION SELECTION

RELATED APPLICATIONS

This application claims priority to U.S. Provisional Patent Application No. 63/543,273, entitled "CCSO with Downsampling Filters and Sample Position Selection," filed Oct. 9, 2023, which is hereby incorporated by reference in its entirety.

TECHNICAL FIELD

The disclosed embodiments relate generally to video coding, including but not limited to systems and methods for loop filtering (e.g., cross-component offset filtering) of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes methods, systems, and non-transitory computer-readable storage media for applying a loop filter for video (image) compression. A video codec includes a plurality of function modules for one or more of: intra/inter prediction, transform coding, quantization, entropy coding, and in-loop filtering. In-loop filtering technologies are applied to adjust reconstructed picture samples to further reduce a reconstruction error. A cross-component offset filtering method is implemented to apply a co-located reconstructed sample and associated neighboring reconstructed samples of a first color component to derive an offset value that is added on a current sample of a second color component, thereby adjusting a reconstruction value of the current sample. Examples of the first color component is a luma color component, and examples of the second color component is a chroma color component. In some implementations, the first color component and the second color component correspond to the same color component, e.g., luma sample.

In various embodiments of this application, samples of a first color component are processed to generate adapted samples of a first color component, and the adapted samples are processed by a cross-component offset filter to determine an offset value that is added on a sample of a second color component. For example, reconstructed luma samples are downsampled, and downsampled luma samples are applied to generate an offset value of a first luma sample or a first chroma sample that is collocated with the first luma sample. In another example, a luma filters are applied on reconstructed luma samples to generate the adapted luma samples that are further processed to generate the offset value.

In accordance with some embodiments, a method of video decoding is provided. The method includes receiving a video bitstream including a current image frame. The video bitstream comprises a first syntax element indicating whether a first sample offset of a first color sample of the current image frame is determined based on one or more luma samples for a cross-component sample offset (CCSO) mode. The method further includes, when the CCSO mode is enabled, generating a set of adapted luma samples including an adapted first luma sample and its adapted neighboring luma samples based on a set of reconstructed luma samples. The set of reconstructed luma samples includes a first luma sample that is collocated with the first color sample of the current image frame. The method further includes determining the first sample offset of the first color sample based on the adapted first luma sample and the one or more adapted neighboring luma samples and reconstructing the current image frame at least by adjusting the first color sample based on the first sample offset.

In accordance with some embodiments, a method of video encoding is provided. The method includes receiving video data comprising a current image frame, encoding the current image frame, enabling a cross-component sample offset (CCSO) mode for generating a first sample offset of a first color sample of the current image frame based on one or more luma samples. In the CCSO mode, the first sample offset of the first color sample is determined based on a set of adapted luma samples, which are further generated based on a set of reconstructed luma samples including a first luma sample that is collocated with the first color sample of the current image frame. The method further includes transmitting the encoded current image frame via a video bitstream and signaling, via the video bitstream, a first syntax element to indicate that the CCSO mode is applied to reconstruct the first color sample collocated with the first luma sample based on the first sample offset.

In accordance with some embodiments, a method of bitstream conversion is provided. The method includes obtaining a source video sequence including a current image frame and performing a conversion between the source video sequence and a video bitstream. The video bitstream includes the current image frame and a first syntax element. The first syntax element indicates whether to generate a first sample offset of a first color sample of the current image frame based on one or more luma samples for a cross-component sample offset (CCSO) mode. The first sample offset of the first color sample is determined based on a set of adapted luma samples that are generated based on a first luma sample and one or more neighboring luma samples, and the first luma sample is collocated with the first color sample.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes methods, systems, and non-transitory computer-readable storage media for applying a loop filter for video (image) compression. In-loop filtering technologies are applied to adjust reconstructed picture samples to further reduce a reconstruction error. A cross-component offset filtering method is implemented to apply a co-located reconstructed sample and associated neighboring reconstructed samples of a first color component to derive an offset value that is added on a current sample of a second color component, thereby adjusting a reconstruction value of the current sample. In various embodiments of this application, a decoder receives a video bitstream from an encoder including a current image frame and a first syntax element. Reconstructed samples of a first color component are used to generate adapted samples of the first color component, and the adapted samples are processed by a cross-component offset filter to determine an offset value that is added on a sample of a second color component. For example, adapted luma samples are applied to generate an offset value of a first luma sample or a first chroma sample that is collocated with the first luma sample.

More specifically, in some embodiments, a video decoder identifies a first luma sample and one or more neighboring luma samples of the first luma sample based on a filter shape. The decoder processes these luma samples to generate adapted luma samples. The decoder may determine one or more adapted difference values between one or more adapted neighboring luma samples and the adapted first luma sample. The adapted luma samples or one or more adapted difference values are quantized, e.g., using a scalar quantizer, to generate one or more quantized values. The scalar quantizer may be specified by quantization intervals (e.g., ranges of values assigned to the same integer) and quantization levels (e.g., integer values to which a quantization interval is assigned). A first color sample is classified, e.g., by a classifier, based on the one or more quantized values to determine a first sample offset of the first color sample. The first color sample is adjusted based on the first sample offset of the first color sample, thereby enabling reconstruction of the current image frame. Further, in some embodiments, the adapted luma samples includes downsampled luma samples generated by a downsampling filter.

Figure 1:
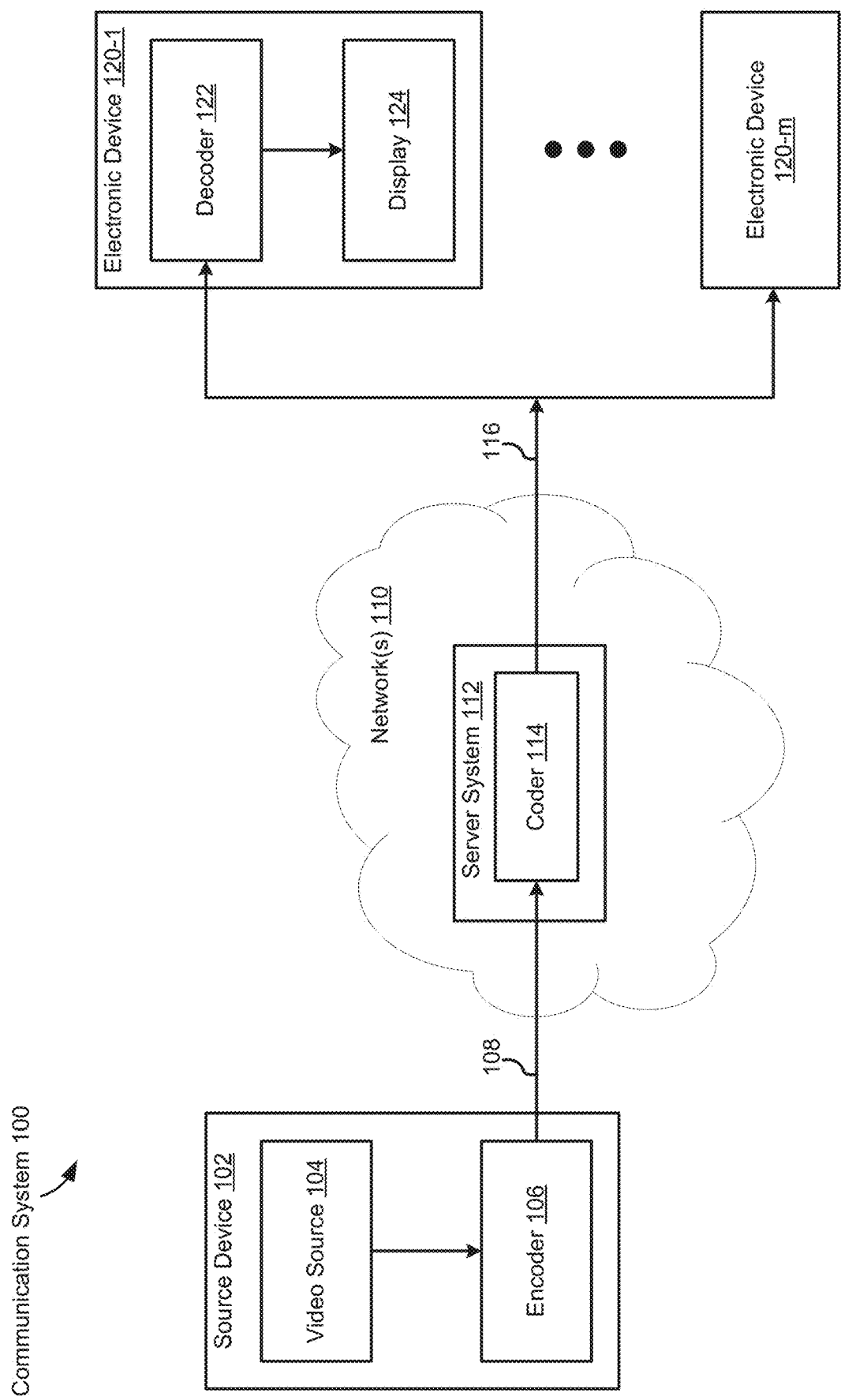
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
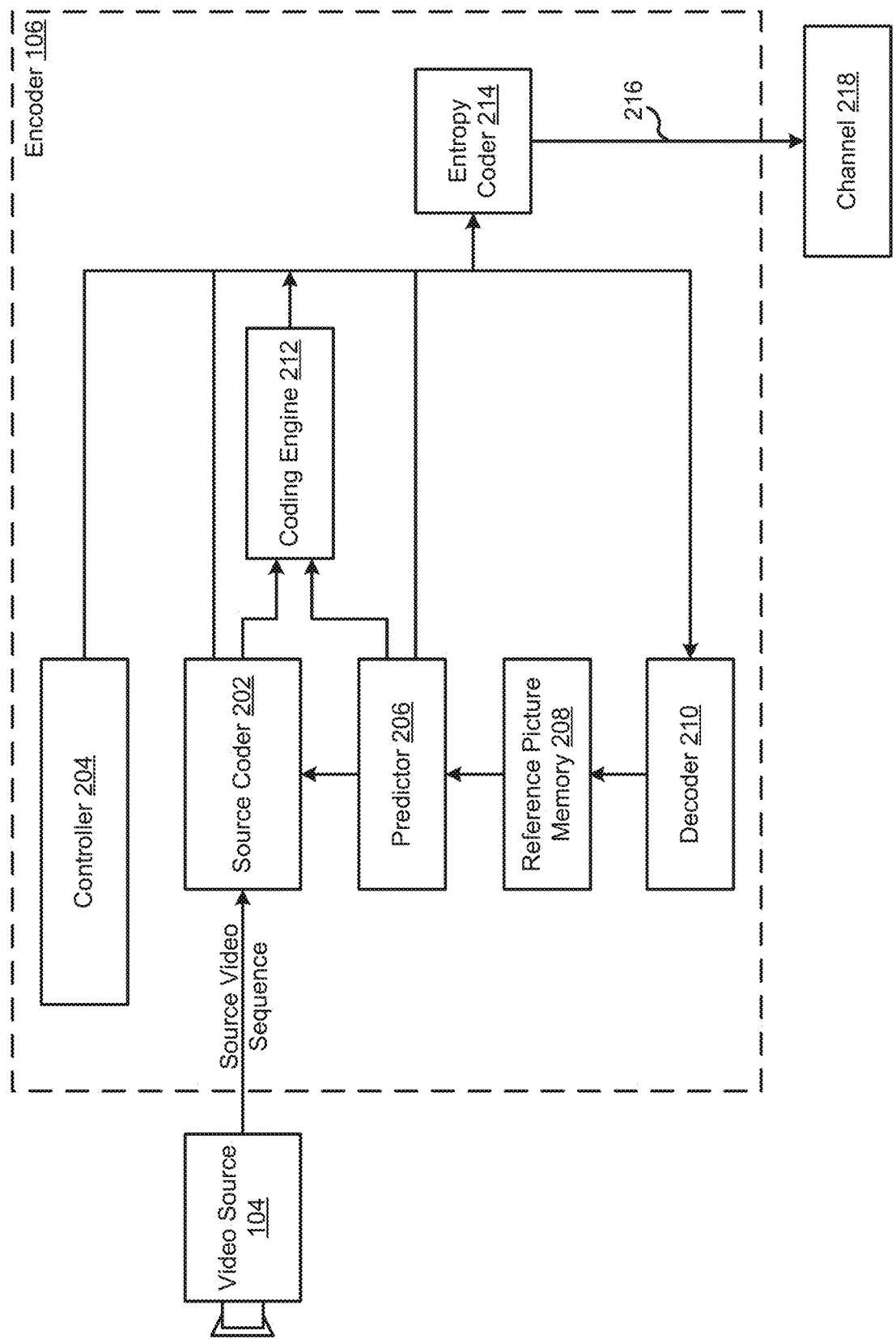
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
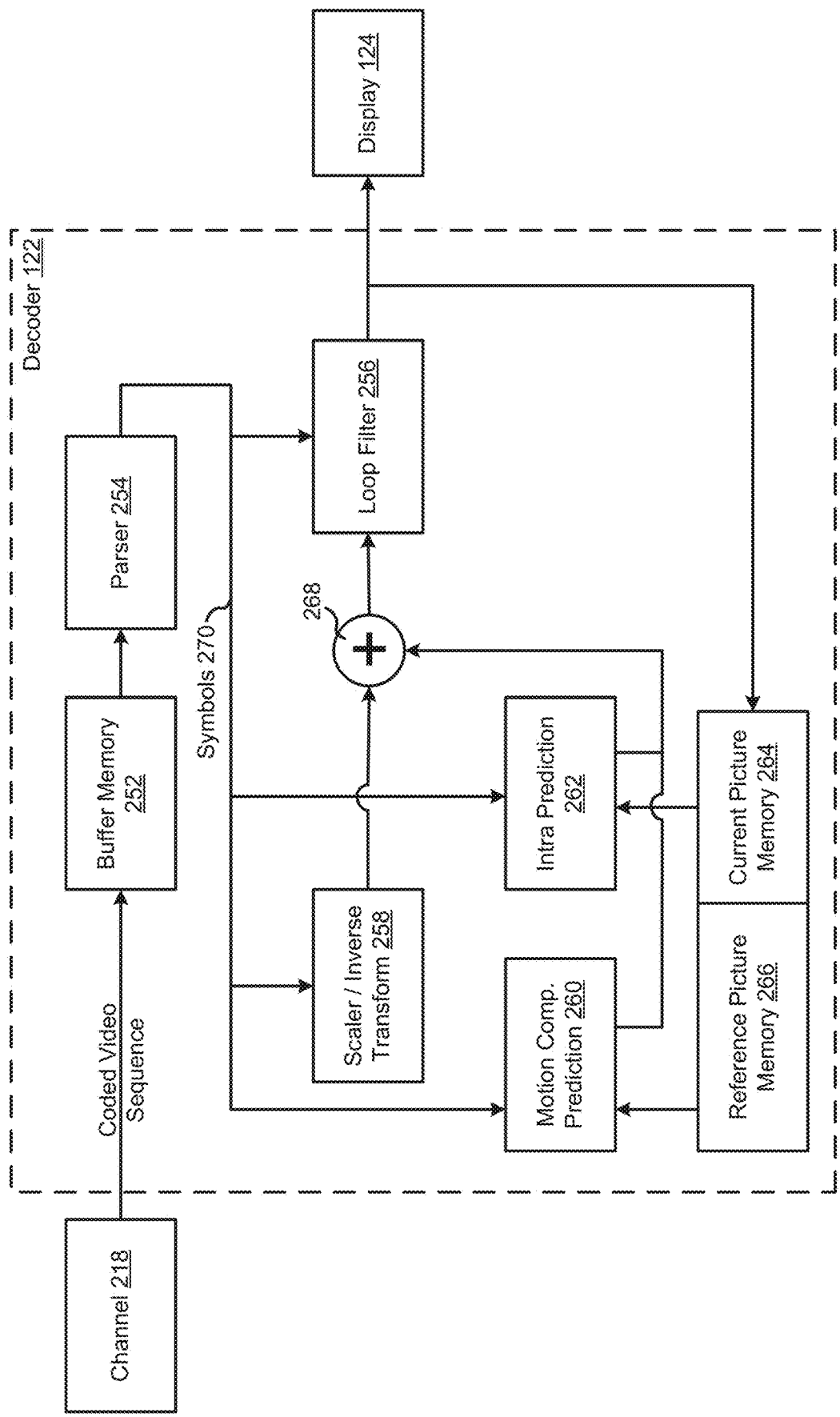
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
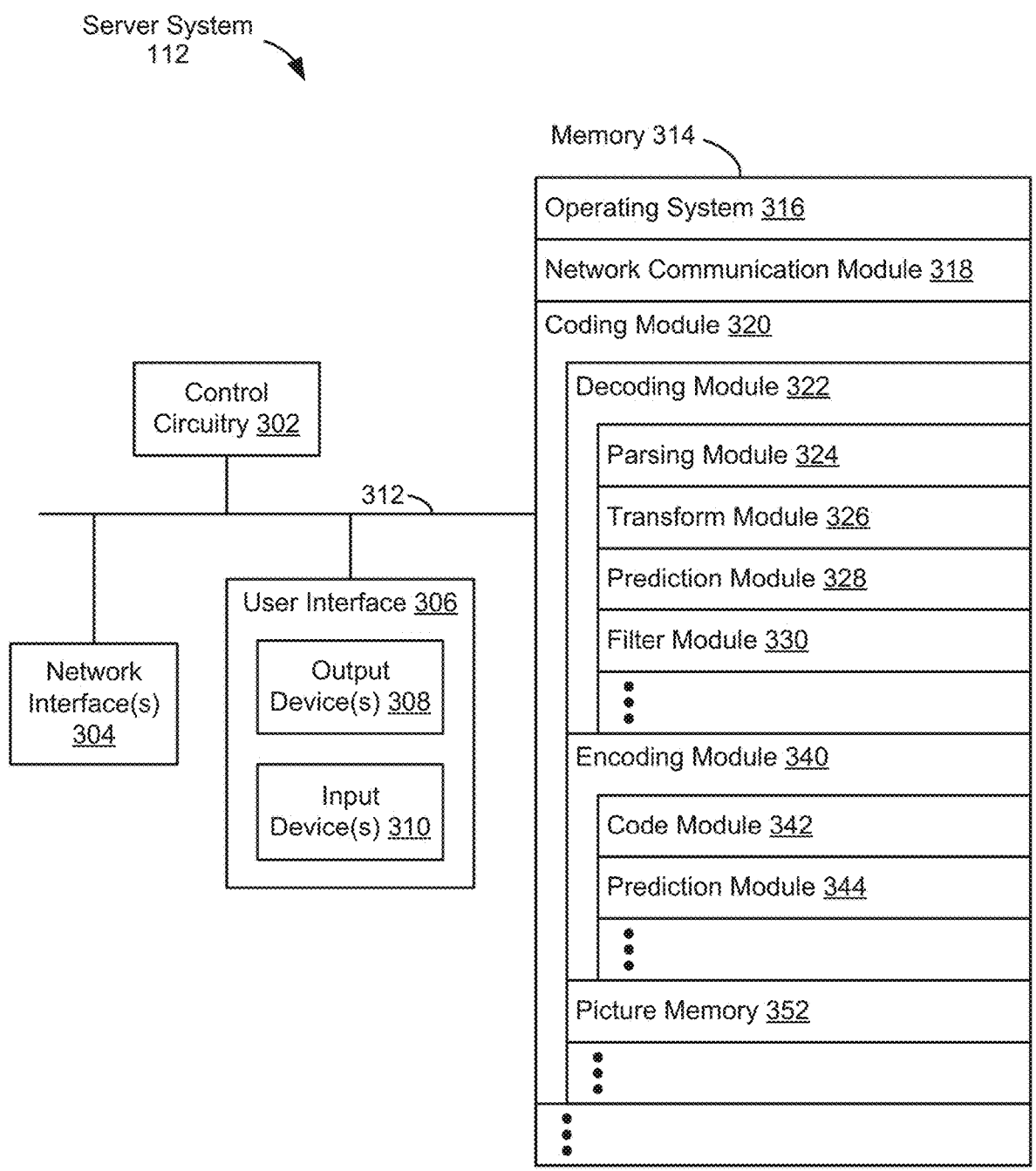
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
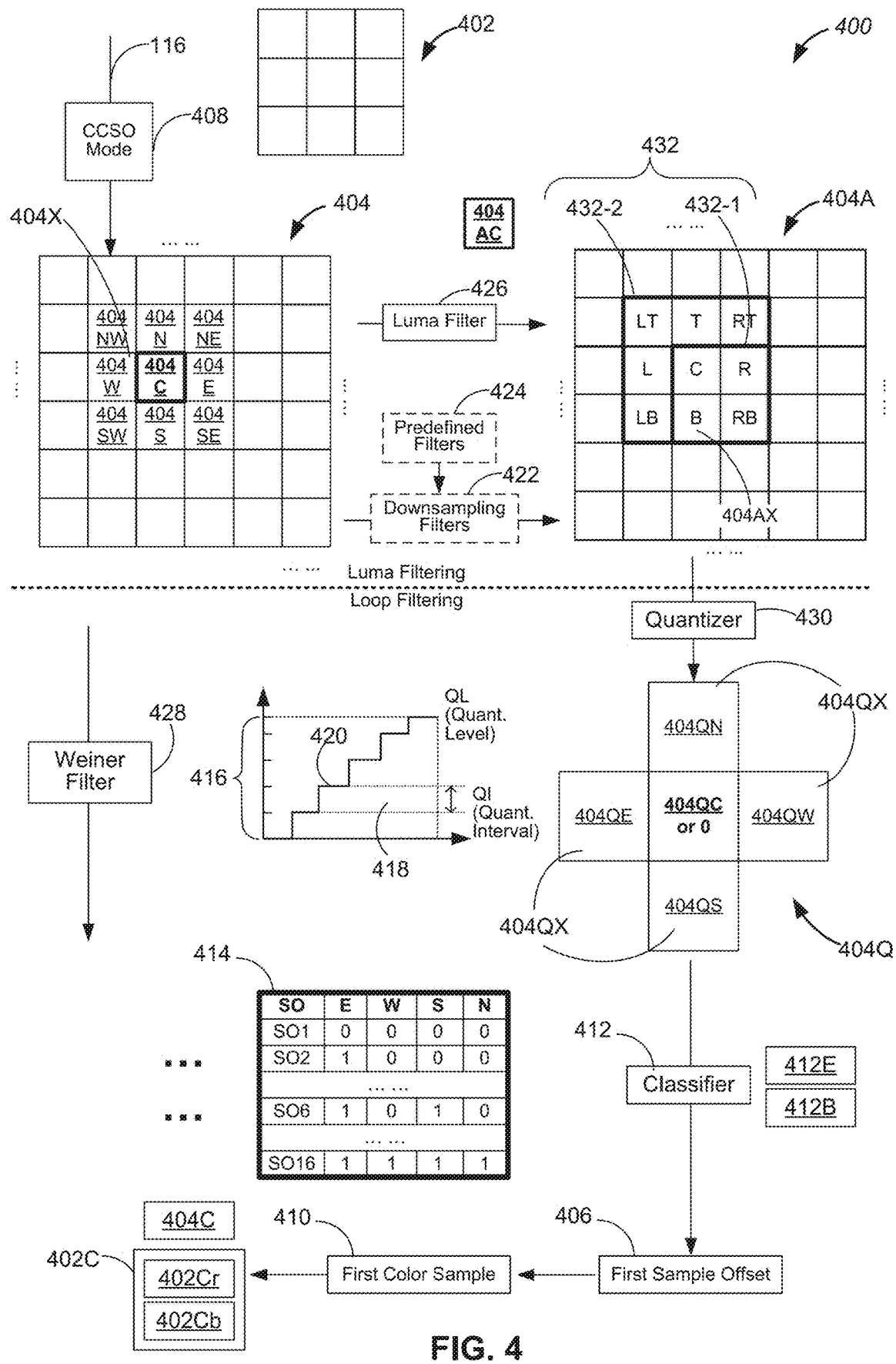
FIG. 4 is a flow diagram of an example process of applying in-loop filtering in video decoding, in accordance with some embodiments.

FIG. 4 is a flow diagram of an example process 400 of applying in-loop filtering in video decoding, in accordance with some embodiments. A GOP includes a sequence of image frames that further includes a current image frame. The current image frame includes a color image, i.e., a non-monochrome image frame, which has a plurality of color samples (e.g., chroma samples 402 and luma samples 404) co-located with one another. After the plurality of color samples of the current image frame are reconstructed, in-loop filtering is applied to adjust a subset of color samples, thereby improving an image quality of the current image frame. In some embodiments, a reconstructed sample and its neighboring reconstructed samples of a first color component are combined to derive an offset value for a second color component, and a reconstructed sample of the second color component is co-located with the reconstructed sample of the first color component and adjusted by the offset value. Alternatively, in some embodiments, reconstructed samples of the first color components are processed to generate a set of adapted sampled. An adapted sample and its adapted neighboring samples of a first color component (e.g., adapted luma samples 404A) are combined to derive an offset value for a second color component (e.g., luma samples 404, chroma samples 402). A sample of the second color component is adjusted by the offset value. The first color component is optionally identical to or distinct from the second color component.

For example, a set of luma samples 404 are processed to generate a plurality of adapted luma samples 404A, and a first luma sample 404A is collocated with an adapted first luma sample 404AC. The adapted first luma sample 404AC and its adapted neighboring luma samples 404AX are combined to derive a sample offset 406, which is applied to adjust a first luma sample 404C itself. In another example, an adapted first luma sample 404AC and its adapted neighboring luma samples 404AX are combined to derive a sample offset 406, and a first chroma sample 402C is co-located with an adapted first luma sample 404AC and adjusted by the sample offset 406. For combining the adapted luma samples 404AC and 404AX, a loop filter 256 is applied to determine one or more of: a number, locations, and weights of adapted neighboring luma samples 404AX, which are applied to generate the sample offset 406.

More specifically, a decoder 122 receives a video bitstream 116 from an encoder 106 including the current image frame. The video bitstream 116 includes a first syntax element. The CCSO mode 408 indicates whether a first sample offset 406 of a first color sample 410 of the current image frame is determined based on one or more luma samples 404 for a cross-component sample offset (CCSO) mode 408. The first syntax element has a first predefined value indicating that the CCSO mode is enabled. The decoder 122 identifies a set of reconstructed luma samples 404, and generates a set of adapted luma samples 404A including an adapted first luma sample 404AC and its adapted neighboring luma samples 404AX based on the set of reconstructed luma samples 404. The set of reconstructed luma samples 404 includes the first luma sample 404C that is collocated with the first color sample 410 and one or more neighboring luma samples 404X of the first luma sample 404C. The first sample offset 406 of the first color sample 410 is determined based on the adapted first luma sample 404AC and the one or more adapted neighboring luma samples 404AX. The decoder 122 reconstructs the current image frame at least by adjusting the first color sample 410 based on the first sample offset 406. In some embodiments, the first color sample 410 is one of: the first luma sample 404C, a first blue-difference chroma (Cb) sample 402Cr, and a first blue-difference chroma (Cb) sample 402Cb. The first luma sample 404C, the first Cb sample 402Cb, and the first Cr sample 402Cr are collocated with one another.

In some embodiments, the set of reconstructed luma sample 404 are downsampled by one or more downsampling filters 422 to generate the adapted luma sample 404A for the CCSO mode 408 based on a resolution of chroma samples 402 that are collocated with the set of reconstructed luma samples 404. Further, in some embodiments, the one or more downsampling filters 422 are predefined and used in both the encoder 106 and the decoder 122 (FIG. 1). In an example, the downsampling filters 422 is selected from a plurality of predefined filters 424 stored in both the encoder 106 and the decoder 122. A syntax element may be passed to selected a subset of predefined filters 424 as the downsampling filter(s) 422. Alternatively, the subset of predefined filters 424 are selected based on other coded information.

In some embodiments, a downsampling filter 422 is selected from a plurality of predefined filters 424. The set of adapted luma samples 404A are generated based on the set of reconstructed luma samples 404 using the downsampling filter 422. The downsampling filter 422 is also applied in a cross-component intra prediction (CCIP) mode to determine a first chroma sample 402C, which is collocated with the first luma sample 404C, based on the set of reconstructed luma samples 404. Further, in some embodiments, In some embodiments, one or more luma filters 426 are applied on the set of reconstructed luma samples 404 to generate the set of adapted luma samples 404A, and a resolution of the reconstructed luma samples 404 is identical to a resolution of the adapted luma samples 404A. For example, a filter type of a luma filter 426 has a cross shape and includes four taps. The neighboring luma samples 404X include a north luma sample 404N (also called an above luma sample), a south luma sample 404S (also called a below luma sample), a west luma sample 404W (also called a left luma sample), and an east luma sample 404E (also called a right luma sample). An adapted first luma sample 404AC is collated with the first luma sample 404C, and is a weighted combination of the first luma sample 404C and the luma samples 404N, 404S, 404W, and 404E.

In some embodiments, the decoder 122 generates the set of adapted luma samples 404A by a applying a luma filter 426 to the set of reconstructed luma samples 404. The decoder 122 applies a cross-component Wiener filter 428 to process the set of reconstructed luma samples 404 jointly with generation of the set of adapted luma samples 404A, thereby reducing a noise level of the set of reconstructed luma samples 404. The Wiener filter 428 is a type of linear filter used to reduce noise (e.g., mean square error) in the adapted luma samples 404A and enhances a quality of brightness information in the current image frame. The Wiener filter 428 may have a filter type identical to that of the luma filter 426 used in the CCSO mode 408.

In some embodiments, the first color sample 410 (e.g., chroma samples 402) has a resolution lower than that of the set of adapted luma samples 404A (e.g., having the same resolution as luma samples 404). The first color sample 410 is physically collocated with at least a subset of adapted luma samples 432 (e.g., a 2×2 luma sample array). One of the subset of adapted luma samples 432 (e.g., a left luma sample in the 2×2 luma sample array) is selected as the adapted first luma sample 404AC collocated with the first color sample 410 to determine the first sample offset 406 of the first color sample 410. Further, in some embodiments, the subset of adapted luma samples 432-1 includes a target luma sample C, a right luma sample R, a bottom luma sample B, and a right-bottom luma sample RB. Additionally, in some embodiments, the set of adapted luma samples 432-2 further includes a left-top luma sample LT, a left luma sample L, a left-bottom luma sample LB, a top luma sample T, and a right-top luma sample RT, e.g. in addition to the four luma samples of the subset of adapted luma samples 432-1. Alternatively, in some embodiments, the subset of adapted luma samples 432 includes a target luma sample C and a set of N adapted neighboring luma samples 404A surrounding the target luma sample C, and the target luma sample L shares a left top corner with the first color sample 410, where N is a positive integer. In an example, the subset of adapted luma samples 432-2 includes the target luma sample C, which shares the left top corner with the first color sample 410, and eight neighboring luma samples 404AX. One of the eight neighboring luma samples 404AX is used as a central position to determine the sample offset 406.

In some embodiments, the CCSO mode 408 corresponds to a band offset classifier 412B. Based on the band offset classifier 412B, the decoder 122 determines that the set of adapted luma samples 404A include an adapted first luma sample 404AC and one or more adapted neighboring luma samples 404AX. The set of adapted luma samples 404A are provided to a quantizer 430, and used to generate one or more quantized values 404Q, which are further applied by the band offset classifier 412B to classify the first color sample 410. For example, in the CSSO mode 408, a filter type has a cross shape and includes four taps. The set of adapted neighboring luma samples 404AX include a north adapted luma sample, a south adapted luma sample, a west adapted luma sample, and an east adapted luma sample, and these adapted luma samples 404AX are further quantized to quantized values 404QN, 404QS, 404QW, and 404QE, respectively. The adapted first luma sample 404AC is quantized to a quantized value 404QC In some embodiments, the CCSO mode 408 corresponds to at least an edge offset classifier 412E. Based on the edge offset classifier 412E, the decoder 122 determines that the one or more adapted luma samples 404A include an adapted first luma sample 404AC and one or more adapted neighboring luma samples 404AX, and further determines one or more adapted difference values between the one or more adapted neighboring luma samples and the adapted first luma sample. The one or more quantized values 404Q are generated based on the one or more adapted difference values and applied by the edge offset classifier 412E to classify the first color sample 410. For example, in the CSSO mode 408, a filter type has a cross shape and includes four taps. The one or more adapted neighboring luma samples include a north adapted luma sample, a south adapted luma sample, a west adapted luma sample, and an east adapted luma sample. The decoder 122 determines one or more adapted difference values between the one or more adapted neighboring luma samples 404AX and the adapted first luma sample 404AC. For example, the one or more adapted difference values includes one or more of: a north adapted difference value, a south adapted difference value, a west adapted difference value, and an east adapted difference value. Each of the adapted difference values are a difference between a respective one of the adapted neighboring luma samples 404AX and the first luma sample 404AC. The one or more difference values are quantized to generate one or more quantized values 404QX. For example, the one or more quantized values 404QX includes one or more of: a north quantized value 404QN, a south quantized value 404QS, a west quantized value 404QW, and an east quantized value 404QE. Each of the adapted difference values is provided to a quantizer 430, and quantized to generate a respective one of the quantized values 404QN, 404QS, 404QW, and 404QE. The quantized value 404QC is equal to 0.

The first color sample 410 is classified, e.g., by a classifier 412, based on the quantized values 404Q to determine the first sample offset 406 of the first color sample 410. In an example, the quantized values 404Q include the quantized values 404QC, 404QN, 404QS, 404QW, and 404QE. A lookup table 414 maps a plurality of combinations of the quantized values 404QC, 404QN, 404QS, 404QW, and 404QE to different sample offset options SO (e.g., SO1-SQ16). Based on the lookup table 414, the quantized values 404Q correspond to one of the combinations in the lookup table 414, and a corresponding sample offset option SO is identified to correspond to a combination of the quantized difference values 404Q and therefore selected for the first sample offset 406. In other words, in some embodiments, the decoder 122 classifies the first color sample 410 by identifying a combination of the one or more quantized values 404Q in a lookup table 414 associating a plurality of quantized combinations with a plurality of offset value options SO (e.g., SO1-SO16) and determining the first sample offset 406 corresponding to the combination of the one or more quantized values 404Q in the lookup table 414.

In some embodiments, adapted luma sample(s) 404A or adapted difference value(s) are quantized to a plurality of integer values in a quantization range 416 using a scalar quantizer 430 including a plurality of quantization intervals 418 (QI) and a plurality of quantization levels 420 (QL), and each of the one or more quantized values 404Q includes a respective integer in the quantization range 416. For each integer value in the quantization range 416, a quantization interval 418 is defined to be a range of values assigned to the respective integer value. A quantization level 420 corresponds to the respective integer value to which the range of difference values associated with the quantization interval 418 are assigned.

The first color sample 410 is adjusted based on the first sample offset 406 of the first color sample 410, thereby enabling reconstruction of the current image frame. In some embodiments, the first color sample 410 includes a first chroma sample 402C that is co-located with the first luma sample 404C in the current image frame, and the first chroma sample 402C is adjusted based on the first sample offset 406. Alternatively, in some embodiments, the first color sample 410 is the first luma sample 404C, and the first luma sample 404C is adjusted based on the first sample offset 406.

Figure 5:
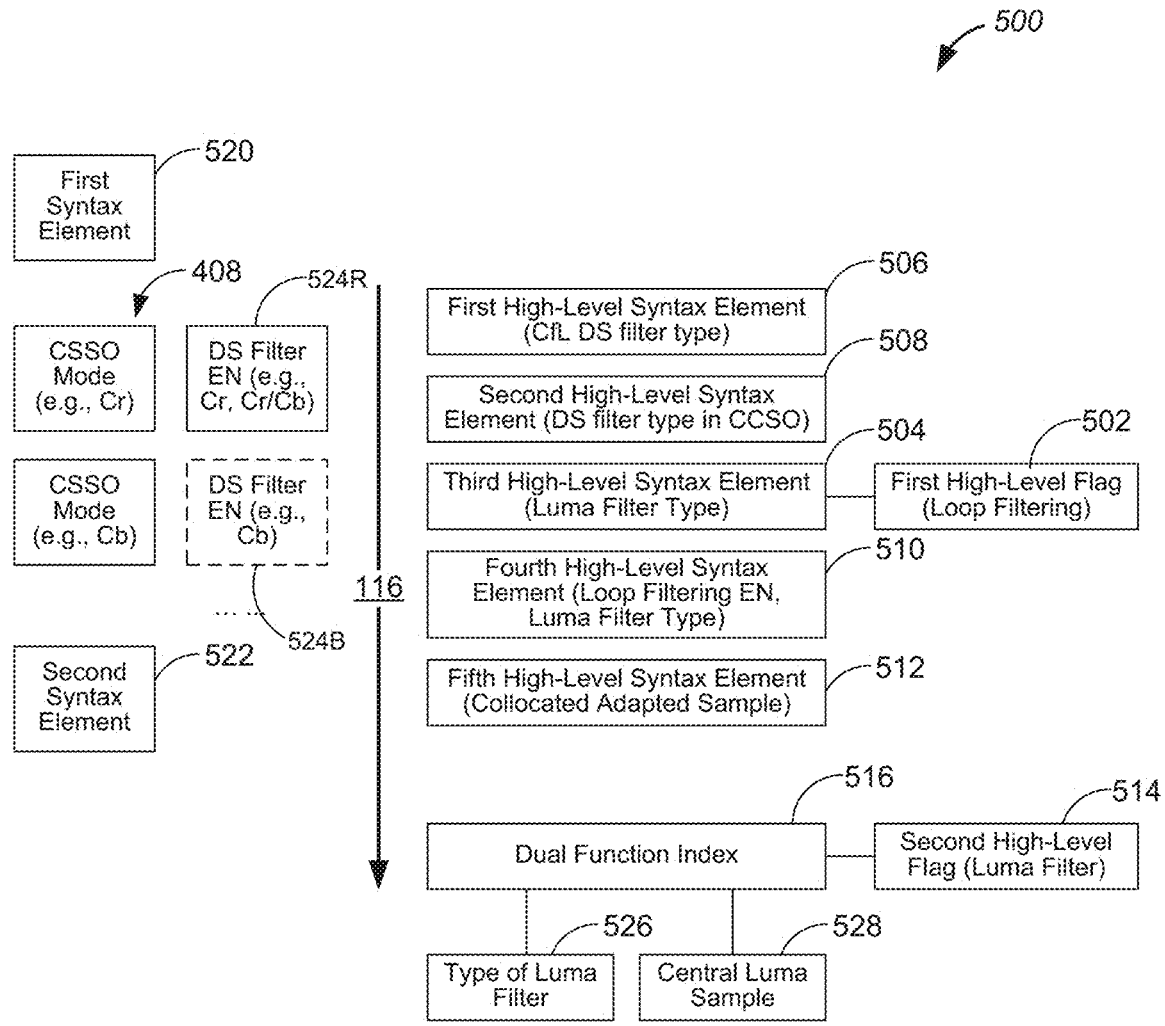
FIG. 5 is a diagram illustrating information embedded in a video bitstream, in accordance with some embodiments.

FIG. 5 is a diagram illustrating information 500 embedded in a video bitstream 116, in accordance with some embodiments. A decoder 122 receives a video bitstream 116 from an encoder 106 including the current image frame. The video bitstream 116 includes a first syntax element 520. The CCSO mode 408 indicates whether a first sample offset 406 of a first color sample 410 of the current image frame is determined based on one or more luma samples 404 for a cross-component sample offset (CCSO) mode 408. The first syntax element has a first predefined value indicating that the CCSO mode is enabled. The decoder 122 identifies a set of reconstructed luma samples 404, and generates a set of adapted luma samples 404A including an adapted first luma sample 404AC and its adapted neighboring luma samples 404AX based on the set of reconstructed luma samples 404. The set of reconstructed luma samples 404 includes the first luma sample 404C that is collocated with the first color sample 410 and one or more neighboring luma samples 404X of the first luma sample 404C. The first sample offset 406 of the first color sample 410 is determined based on the adapted first luma sample 404AC and the one or more adapted neighboring luma samples 404AX. The decoder 122 reconstructs the current image frame at least by adjusting the first color sample 410 based on the first sample offset 406.

In some embodiments, the video bitstream 116 further includes a first high-level flag 502 indicating whether loop filtering is enabled. In accordance with a determination that the first high-level flag 502 indicates that loop filtering is enabled, the decoder 122 identifies a third high-level syntax element 504 (e.g., an index) that determines a luma filter 426 for generating the adapted luma samples 404A from the reconstructed luma samples 404. For example, the decoder 122 selects the luma filter 426 from a set of predefined filters stored in a decoder-side memory using the index. Conversely, in accordance with a determination that the first high-level flag 502 indicates that loop filtering is disabled, the decoder 122 applies the set of reconstructed luma samples 404 as the set of adapted luma samples 404A, e.g., without using the luma filter 426. The first sample offset 406 of the first color sample 410 is determined based on the set of reconstructed luma samples 404 (e.g., not based on the set of adapted luma samples 404A).

In some embodiments, a downsampling filter 422 is selected from a plurality of predefined filters 424. The set of adapted luma samples 404A are generated based on the set of reconstructed luma samples 404 using the downsampling filter 422. The downsampling filter 422 is also applied in a cross-component intra prediction (CCIP) mode to determine a first chroma sample 402C, which is collocated with the first luma sample 404C, based on the set of reconstructed luma samples 404. Further, in some embodiments, the video bitstream 116 further includes a first high-level syntax element 506 for a type of the downsampling filter 422 configured to downsample the set of reconstructed luma samples 404 for predicting one or more chroma samples 402 in the CCIP mode. The first high-level syntax element 506 is signaled in one of: a sequence header, a picture header, a subpicture header, a slice header, a tile header, and a superblock header. The downsampling filter 422 is selected based on the first high-level syntax element 506.

In some embodiments, the video bitstream 116 further includes a second high-level syntax element 508 for a type of the downsampling filter configured to downsample the set of reconstructed luma samples 404 to generate the set of adapted luma samples 404A in the CCSO mode 408. The second high-level syntax element is signaled in one of: a sequence header, a picture header, a subpicture header, a slice header, a tile header, and a superblock header. The downsampling filter 422 is selected based on the second high-level syntax element 508. The downsampling filter 422 is also used for chroma predication from luma samples in the CCIP mode, although its type is signaled with the CCSO mode 408.

In some embodiments, the video bitstream 116 further includes a fourth high-level syntax element 510 (e.g., an index) having a plurality of bits. In accordance with a determination that the plurality of bits of the fourth high-level syntax element 510 corresponds to a first predefined value (e.g., "000"), the decoder 116 applies the set of reconstructed luma samples 404 as the set of adapted luma samples 404A. Stated another way, the CCSO mode 408 is disabled. The first sample offset 406 of the first color sample 410 is determined based on the set of reconstructed luma samples 404. In accordance with a determination that the plurality of bits of the fourth high-level syntax element 510 corresponds to a second predefined value (e.g., "100") different from the first predefined value, the decoder 116 determines a luma filter 426 for generating the adapted luma samples 404A from the reconstructed luma samples 404 based on the second predefined value. For example, the plurality of bits has three bits. The first bit indicates whether the CCSO mode 408 is enabled, and if the CCSO mode 408 is enabled, the last two bits are applied to select one of a plurality of predefined filters as the luma filter 426. The second predefined value equal to "100," "101," "110," and "111" corresponds to each of four distinct luma filter types.

In some embodiments, the first color sample 410 includes a first Cb sample 402Cb that is collocated with the first luma sample 404C and a first Cr sample 402Cr of the current image frame. The video bitstream 116 further includes a second syntax element 522 for the CCSO mode 408 indicating whether a second sample offset 406R of the first Cr sample 402Cb is determined based on one or more luma samples 404. The video bitstream 116 further includes two distinct high-level indices 524R and 524B indicating whether to apply two downsampling filters 422 for generating the first Cb sample 402Cb and the first Cr sample 402Cr, respectively. Each of the two downsampling filters 422 is applied in cross-component intra prediction, loop filtering, or both for a respective chroma sample. For example, a first downsampling filter is applied in one or more of prediction of the first Cb sample 402Cb from luma samples 404, Wiener filtering of the first Cb sample 402Cb, and CCSO mode 408 associated with the first Cb sample 402Cb.

In some embodiments, the first color sample 410 includes one of a first Cb sample 402Cb and a first Cr sample 402Cr, and the first Cb sample 420Cb and the first Cr sample 402Cr are collocated with the first luma sample 404C. The video bitstream further includes a common high-level index 524R indicating whether to apply a downsampling filter 422 for generate both the first Cb sample 402Cb and the first Cr sample 402Cr. The downsampling filter 422 is applied in cross-component intra prediction and/or loop filtering of the first Cb sample 402Cb and the first Cr sample 402Cr.

In some embodiments, the first color sample 410 (e.g., chroma samples 402) has a resolution lower than that of the set of adapted luma samples 404A (e.g., having the same resolution as luma samples 404). The first color sample 410 is physically collocated with at least a subset of adapted luma samples 432 (e.g., a 2×2 luma sample array). One of the subset of adapted luma samples 432 (e.g., a left luma sample in the 2×2 luma sample array) is selected as the adapted first luma sample 404AC collocated with the first color sample 410 to determine the first sample offset 406 of the first color sample 410. Further, in some embodiments, the video bitstream 116 further includes a fifth high-level syntax element 512 for selecting the one of the subset of adapted luma samples 432 (e.g., LT, T, RT, L, C, R, LB, B, or RB in FIG. 4) for determining the first sample offset 406 of the first color sample 410 in the CCSO mode 408, and the fifth high-level syntax element 512 is signaled on a frame level or for a first color component corresponding to the first color sample 410.

In some embodiments, the video bitstream 116 further includes a second high-level flag 514 indicating whether a luma filter 426 is applied in loop filtering (e.g., in the CSSO mode 408). In accordance with a determination that the second high-level flag 514 indicates that the luma filter 426 is applied in loop filtering (e.g., when the second high-level flag 514 is "1"), the decoder 122 identifies a dual function index 516 and determines the luma filter 426 for generating the adapted luma samples 404A from the reconstructed luma samples 404 based on the dual function index 516. For example, the luma filter 426 is selected from a plurality of predefined filters, and different values of the dual function index 516 correspond to different luma filter types 526. Conversely, in accordance with a determination that the second high-level flag 514 indicates that the luma filter 426 is not applied in loop filtering (e.g., when the second high-level flag 514 is "0"), the decoder 122 identifies the dual function index 516 and selects one of the set of adapted luma samples 404A for determining the first sample offset 406 of the first color sample 410 in the CCSO mode 408 based on the dual function index 516. For example, the one of the set of adapted luma samples 404A is selected as being collocated with the first color sample 410, and associated adapted neighboring luma samples 404AX are used to determine the first sample offset 406 jointly with the selected one of the set of adapted luma samples 404A. Different values of the dual function index 516 correspond to different selected adapted luma samples 528 (e.g., LT, T, RT, L, C, R, LB, B, or RB).

Figure 6:
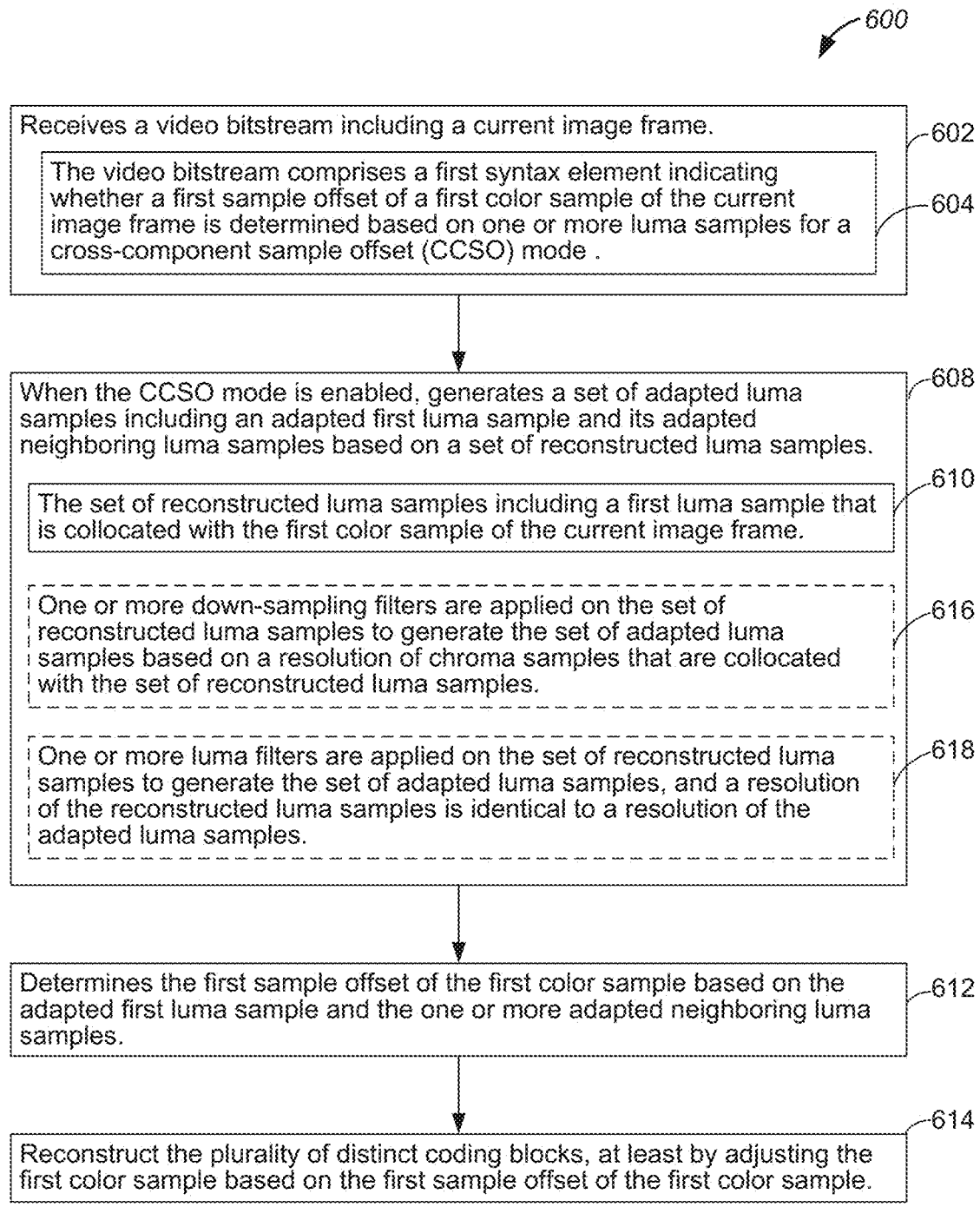
FIG. 6 is a flow diagram illustrating a method of coding video, in accordance with some embodiments.

FIG. 6 is a flow diagram illustrating an example method 600 of coding video, in accordance with some embodiments. The method 600 may be performed at a computing system (e.g., the server system 112, the source device 102, or the electronic device 120 in FIG. 1) having control circuitry and memory storing instructions for execution by the control circuitry. In some embodiments, the method 600 is applied jointly with one or more video codecs, including but not limited to, H.264, H.265/HEVC, H.266/VVC, AV1 and AVS/AVS2/AVS3. In various implementations of this application, one or more filters (e.g., luma filter 426) are applied to the samples of the first color component, before being fed into a cross-component offset filter as input, and the filtered samples (e.g., adapted luma samples 404A) are used to compute the offset values 406.

In some embodiments, one or more filters (e.g., luma filters 426) are applied to the samples of the first color components (e.g., luma samples 404), depending on the chroma format. For example, for a 4:2:0 chroma format, a downsampling filter 422 is applied to both horizontal and vertical directions. The output samples (e.g., adapted luma samples 404A) of the filtering process are used to compute the offset values 406 that are applied to the second color components (e.g., luma samples 404, chroma samples 402). In an example, the one or more filters includes a downsampling filter 422 (FIG. 4) used for performing downsampling operation. Conversely, in another example, the one or more filters (e.g., a luma filter 426 in FIG. 4) are used for filtering the reconstruction samples (e.g., luma samples 404) without changing the resolution. In other words, the one or more filters are not downsampling filters. In some embodiments, the first color component is luma and the second color component is a chroma component (e.g., blue-difference chroma (Cb) sample, difference chroma (Cb) sample). Alternatively, in some embodiments, both the first and the second color components are luma. In some embodiments, the one or more filters are used for performing downsampling operation, and these downsampling filters 422 are pre-defined (e.g., selected from predefined filters 424) and used both at the encoder 106 and the decoder 122.

In some embodiments, the one or more filters are used for performing downsampling operation, and three downsampling filters that were used in cross-components intra mode predication (e.g., chroma from luma mode) are used in this the downsampling process. The high-level (frame/sequence) level filter selection indicators of the cross-components intra mode prediction indicates which filter is used in this downsampling process. That is, the downsampling filter selection is kept same and shared between a cross-components intra mode prediction module and a cross-component loop filtering module. The cross-components intra mode prediction module is configured to determine chroma samples 402 based on luma samples 404. The cross-component loop filtering module is configured to generate the sample offset 406 in loop filtering.

Alternatively, in some embodiments, the one or more filters are used for performing downsampling operation, and three downsampling filters that were used in cross-components intra mode predication (e.g., chroma from luma mode) are used in this downsampling process. A dedicated high-level (frame/sequence) level indicator is signaled for the cross-component loop filter downsampling process.

In some embodiments, a high-level flag is signaled to indicate whether the filtering process is enabled. If the filtering process is enabled, a further high-level index is signaled to indicate which filter is used. If the downsampling process is disabled, the luma samples 404 that are not downsampled are used to compute the sample offset 406 for chroma samples 402.

In some embodiments, a high-level index is signaled with N bits (e.g., 2 bits). If this index equals to 0, the filtering process is disabled. Otherwise, the filtering process is enabled and index indicates which filter is used to generate the adapted luma samples 404A. The high-level index is on a level higher than a block level.

In some embodiments, the above mentioned high-level flags, indices, indicators, or syntax elements are signaled individually and separately for two chroma components (Cb and Cr). Filtering and downsampling processes are independently controlled between these two chroma components. Conversely, in some embodiments, the above mentioned high-level flags, indices, indicators, or syntax elements are signaled jointly for the two chroma components. Filtering and downsampling processes are controlled jointly (e.g., using the same filters) between the two chroma components.

In some embodiments, the cross-component sample offset 406 and a cross-component wiener filter 428 share the same filter type, and are controlled jointly by a filtering and downsampling process decision (e.g., based on the same syntax element). In other words, the Wiener filter is the same type of filter (e.g., a filter shape, locations of neighboring samples) as the luma filter 426.

In some embodiments, the luma samples 404, which are not downsampled, are used to determine the chroma offset values 406. A central position of the luma sample 404 is collocated with a first chroma sample 402C and selected from a subset of luma samples 404 or 404A. In an example, the collocated luma sample 404C is selected from four positions, that is, the collocated luma sample 404C or C, the right of the collocated luma sample 404E or R, the bottom of the collocated luma sample 404S or B, the right-bottom of the collocated luma sample 404SE or RB, and used to determine the chroma offsets 406. A high-level index (each frame, or each component of the frame) is signaled the indicate which position is used. In another example, nine positions including the collocated luma position and the surrounding eight luma positions can be used as the central position to compute the chroma offsets 402. A high-level index (each frame, or each component of the frame) is signaled the indicate which position is used. In an example, N positions (e.g., eight positions) around the collocated luma position 404C or C can be used as the central position to compute the chroma offsets. A high-level index (each frame, or each component of the frame) is signaled the indicate which position is used.

In some embodiments, selection of a collocated luma position is applied to select an adapted luma sample from the set of adapted luma sample 404A. A high-level flag (per frame or per frame component) is signaled to indicate whether downsampling or filtering is applied. If downsampling or filtering is applied, an index is signaled to indicate a type of the filter that is used. Conversely, if the downsampling or filtering is not applied, an index is signaled to indicate which position is used as a luma position used to compute the associated chroma offsets 406.

Although FIG. 6 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 600 is implemented for decoding video data. The method 600 includes receiving (operation 602) a video bitstream including a current image frame, where the video bitstream comprises (operation 604) a first syntax element indicating whether a first sample offset of a first color sample of the current image frame is determined based on one or more luma samples for a cross-component sample offset (CCSO) mode; when the CCSO mode is enabled, generating (operation 608) a set of adapted luma samples including an adapted first luma sample and its adapted neighboring luma samples based on a set of reconstructed luma samples, the set of reconstructed luma samples including (operation 610) a first luma sample that is collocated with the first color sample of the current image frame; determining (operation 612) the first sample offset of the first color sample based on the adapted first luma sample and the one or more adapted neighboring luma samples; and reconstructing (operation 614) the current image frame at least by adjusting the first color sample based on the first sample offset.

(A2) In some embodiments of A1, one or more down-sampling filters are applied (operation 616) on the set of reconstructed luma samples to generate the set of adapted luma samples based on a resolution of chroma samples that are collocated with the set of reconstructed luma samples.

(A3) In some embodiments of A2, the one or more down-sampling filters are predefined and used in an encoder and a decoder.

(A4) In some embodiments of A1, one or more luma filters are applied (operation 618) on the set of reconstructed luma samples to generate the set of adapted luma samples, and a resolution of the reconstructed luma samples is identical to a resolution of the adapted luma samples.

(A5) In some embodiments of any of A1-A4, the first color sample is one of: the first luma sample, a first blue-difference chroma (Cb) sample, and a first blue-difference chroma (Cb) sample, where the first luma sample, the first Cb sample, and the first Cr sample are collocated with one another.

(A6) In some embodiments of any of A1-A5, the method 600 further comprises: selecting a down-sampling filter from a plurality of predefined filters; and applying the down-sampling filter in a cross-component intra prediction (CCIP) mode to determine a first chroma sample, which is collocated with the first luma sample, based on the set of reconstructed luma samples; where the set of adapted luma samples are generated based on the set of reconstructed luma samples using the down-sampling filter.

(A7) In some embodiments of A6, the video bitstream further includes a first high-level syntax element for a type of the down-sampling filter configured to down-sample the set of reconstructed luma samples for predicting one or more chroma samples in a cross-component intra prediction (CCIP) mode. The first high-level syntax element is signaled in one of: a sequence header, a picture header, a subpicture header, a slice header, a tile header, and a superblock header; and the down-sampling filter is selected based on the first high-level syntax element.

(A8) In some embodiments of A6 or A7, the video bitstream further includes a second high-level syntax element for a type of the down-sampling filter configured to down-sample the set of reconstructed luma samples to generate the set of adapted luma samples in the CCSO mode. The second high-level syntax element is signaled in one of: a sequence header, a picture header, a subpicture header, a slice header, a tile header, and a superblock header. The down-sampling filter is selected based on the second high-level syntax element.

(A9) In some embodiments of any of A1-A8, the video bitstream further includes a first high-level flag indicating whether loop filtering is enabled. The method 600 further comprises: in accordance with a determination that the first high-level flag indicates that loop filtering is enabled, identifying a third high-level index that determines a luma filter for generating the adapted luma samples from the reconstructed luma samples; and in accordance with a determination that the first high-level flag indicates that loop filtering is disabled, applying the set of reconstructed luma samples as the set of adapted luma samples, where the first sample offset of the first color sample is determined based on the set of reconstructed luma samples.

(A10) In some embodiments of any of A1-A9, the video bitstream further includes a fourth high-level syntax element having a plurality of bits. The method 600 further comprises: in accordance with a determination that the plurality of bits of the fourth high-level syntax element corresponds to a first predefined value, applying the set of reconstructed luma samples as the set of adapted luma samples, where the first sample offset of the first color sample is determined based on the set of reconstructed luma samples; and in accordance with a determination that the plurality of bits of the fourth high-level syntax element corresponds to a second predefined value different from the first predefined value, determining a luma filter for generating the adapted luma samples from the reconstructed luma samples based on the second predefined value.

(A11) In some embodiments of any of A1-A10, the first color sample includes a first Cb sample that is collocated with the first luma sample and a first Cr sample of the current image frame. The video bitstream further includes a second syntax element for a CCSO mode indicating whether a second sample offset of the first Cr sample is determined based on one or more luma samples. The video bitstream further includes two distinct high-level indices indicating whether to apply two down-sampling filters for generating the first Cb sample and the first Cr sample, respectively, where each of the two down-sampling filters is applied in cross-component intra prediction, loop filtering, or both of a respective chroma sample.

(A12) In some embodiments of any of A1-A10, the first color sample includes one of a first Cb sample and a first Cr sample, the first Cb sample and the first Cr sample are collocated with the first luma sample. The video bitstream further includes a common high-level index indicating whether to apply a down-sampling filter for generate both the first Cb sample and the first Cr sample, where the down-sampling filter is applied in cross-component intra prediction, loop filtering, or both of the first Cb sample and the first Cr sample.

(A13) In some embodiments of any of A1-A12, the method 600 further comprises: applying a cross-component Wiener filter to process the set of adapted luma samples that are generated from the set of reconstructed luma samples for the CCSO mode.

(A14) In some embodiments of any of A1-A13, the first color sample has a resolution lower than that of the set of adapted luma samples, and is physically collocated with at least a subset of the adapted luma samples. One of the set of adapted luma samples is selected as the adapted first luma sample to determine the first sample offset of the first color sample.

(A15) In some embodiments of A14, the video bitstream further includes a fifth high-level syntax element for selecting the one of the set of adapted luma samples for determining the first sample offset of the first color sample in the CCSO mode, and the fifth high-level syntax element is signaled on a frame level or for a first color component corresponding to the first color sample.

(A16) In some embodiments of A14 or A15, the set of adapted luma samples includes a left luma sample, a right luma sample, a bottom luma sample, and a right-bottom luma sample.

(A17) In some embodiments of A16, the set of adapted luma samples further includes a left-top luma sample, a left luma sample, a left-bottom luma sample, a top luma sample, and a right-top luma sample.

(A18) In some embodiments of any of A14 or A15, the set of adapted luma samples includes a left-top luma sample and a set of N neighboring luma samples surrounding the left-top luma sample, and the left-top luma sample shares a left top corner with the first color sample, and N is a positive integer.

(A19) In some embodiments of any of A1-A18, the video bitstream further includes a second high-level flag indicating whether a luma filter is applied in loop filtering. The method 600 further comprises: in accordance with a determination that the second high-level flag indicates that the luma filter is applied in loop filtering, identifying a dual function index and determining the luma filter for generating the adapted luma samples from the reconstructed luma samples based on the dual function index; and in accordance with a determination that the second high-level flag indicates that the luma filter is not applied in loop filtering, identifying the dual function index and selecting one of the set of adapted luma samples for determining the first sample offset of the first color sample in the CCSO mode based on the dual function index.

(A20) In some embodiments of any of A1-A19, determining the first sample offset of the first color sample further comprises: generating one or more quantized values based on the adapted neighboring luma samples and the adapted first luma sample; and classifying the first color sample based on the one or more quantized values to determine the first sample offset of the first color sample.

(A21) In some embodiments of A20, generating the one or more quantized values further comprises: determining one or more difference values between the adapted neighboring luma samples and the adapted first luma sample. The one or more difference values are quantized to generate the one or more quantized values.

(A22) In some embodiments, a method for encoding video data includes: receiving video data comprising a current image frame; encoding the current image frame; enabling a cross-component sample offset (CCSO) mode for generating a first sample offset of a first color sample of the current image frame based on one or more luma samples, where in the CCSO mode, the first sample offset of the first color sample is determined based on a set of adapted luma samples, which are further generated based on a set of reconstructed luma samples including a first luma sample that is collocated with the first color sample of the current image frame; transmitting the encoded current image frame via a video bitstream; and signaling, via the video bitstream, a first syntax element to indicate that the CCSO mode is applied to reconstruct the first color sample collocated with the first luma sample based on the first sample offset.

(A23) In some embodiments, a method for generating a bitstream includes: obtaining a source video sequence including a current image frame; and performing a conversion between the source video sequence and a video bitstream, where the video bitstream comprises: the current image frame; and a first syntax element indicating whether to generate a first sample offset of a first color sample of the current image frame based on one or more luma samples for a cross-component sample offset (CCSO) mode; where the first sample offset of the first color sample is determined based on a set of adapted luma samples that are generated based on a first luma sample and one or more neighboring luma samples, and the first luma sample is collocated with the first color sample.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A23 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A23 above).

The proposed methods may be used separately or combined in any order. Further, each of the methods (or embodiments), encoder, and decoder may be implemented by processing circuitry (e.g., one or more processors or one or more integrated circuits). For example, the one or more processors execute a program that is stored in a non-transitory computer-readable medium. In the following, the term block may be interpreted as a prediction block, a coding block, or a coding unit, i.e., CU.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:
1. A method for decoding video data, comprising:
receiving a video bitstream including a current image frame, wherein the video bitstream comprises a first syntax element indicating whether a first sample offset of a first color sample of the current image frame is determined based on one or more luma samples for a cross component sample offset (CCSO) mode;

when the CCSO mode is enabled, generating a set of adapted luma samples including an adapted first luma sample and its adapted neighboring luma samples based on a set of reconstructed luma samples, the set of reconstructed luma samples including a first luma sample that is collocated with the first color sample of the current image frame;

determining the first sample offset of the first color sample based on the adapted first luma sample and the one or more adapted neighboring luma samples; and reconstructing the current image frame at least by adjusting the first color sample based on the first sample offset.

2. The method of claim 1, wherein one or more down-sampling filters are applied on the set of reconstructed luma samples to generate the set of adapted luma samples based on a resolution of chroma samples that are collocated with the set of reconstructed luma samples.

3. The method of claim 2, wherein the one or more down-sampling filters are predefined and used in an encoder and a decoder.

4. The method of claim 1, wherein one or more luma filters are applied on the set of reconstructed luma samples to generate the set of adapted luma samples, and a resolution of the reconstructed luma samples is identical to a resolution of the adapted luma samples.

5. The method of claim 1, wherein the first color sample is one of: the first luma sample, a first blue-difference chroma (Cb) sample, and a first blue-difference chroma (Cb) sample, wherein the first luma sample, the first Cb sample, and the first Cr sample are collocated with one another.

6. The method of claim 1, further comprising:
selecting a down-sampling filter from a plurality of predefined filters; and
applying the down-sampling filter in a cross-component intra prediction (CCIP) mode to determine a first chroma sample, which is collocated with the first luma sample, based on the set of reconstructed luma samples;
wherein the set of adapted luma samples are generated based on the set of reconstructed luma samples using the down-sampling filter.

7. The method of claim 6, wherein:
the video bitstream further includes a first high-level syntax element for a type of the down-sampling filter configured to down-sample the set of reconstructed luma samples for predicting one or more chroma samples in a cross-component intra prediction (CCIP) mode;
the first high-level syntax element is signaled in one of: a sequence header, a picture header, a subpicture header, a slice header, a tile header, and a superblock header; and
the down-sampling filter is selected based on the first high-level syntax element.

8. The method of claim 6, wherein:
the video bitstream further includes a second high-level syntax element for a type of the down-sampling filter configured to down-sample the set of reconstructed luma samples to generate the set of adapted luma samples in the CCSO mode;
the second high-level syntax element is signaled in one of: a sequence header, a picture header, a subpicture header, a slice header, a tile header, and a superblock header; and
the down-sampling filter is selected based on the second high-level syntax element.

9. The method of claim 1, wherein the video bitstream further includes a first high-level flag indicating whether loop filtering is enabled, the method further comprising:
in accordance with a determination that the first high-level flag indicates that loop filtering is enabled, identifying a third high-level index that determines a luma filter for generating the adapted luma samples from the reconstructed luma samples; and
in accordance with a determination that the first high-level flag indicates that loop filtering is disabled, applying the set of reconstructed luma samples as the set of adapted luma samples, wherein the first sample offset of the first color sample is determined based on the set of reconstructed luma samples.

10. The method of claim 1, wherein the video bitstream further includes a fourth high-level syntax element having a plurality of bits, the method further comprising:
in accordance with a determination that the plurality of bits of the fourth high-level syntax element corresponds to a first predefined value, applying the set of reconstructed luma samples as the set of adapted luma samples, wherein the first sample offset of the first color sample is determined based on the set of reconstructed luma samples; and
in accordance with a determination that the plurality of bits of the fourth high-level syntax element corresponds to a second predefined value different from the first predefined value, determining a luma filter for generating the adapted luma samples from the reconstructed luma samples based on the second predefined value.

11. The method of claim 1, wherein:
the first color sample includes a first Cb sample that is collocated with the first luma sample and a first Cr sample of the current image frame;
the video bitstream further includes a second syntax element for a CCSO mode indicating whether a second sample offset of the first Cr sample is determined based on one or more luma samples; and
the video bitstream further includes two distinct high-level indices indicating whether to apply two down-sampling filters for generating the first Cb sample and the first Cr sample, respectively, wherein each of the two down-sampling filters is applied in cross-component intra prediction, loop filtering, or both of a respective chroma sample.

12. The method of claim 1, wherein:
the first color sample includes one of a first Cb sample and a first Cr sample, the first Cb sample and the first Cr sample are collocated with the first luma sample;
the video bitstream further includes a common high-level index indicating whether to apply a down-sampling filter for generate both the first Cb sample and the first Cr sample, wherein the down-sampling filter is applied in cross-component intra prediction, loop filtering, or both of the first Cb sample and the first Cr sample.

13. The method of claim 1, further comprising:
applying a cross-component Wiener filter to process the set of adapted luma samples that are generated from the set of reconstructed luma samples for the CCSO mode.

14. The method of claim 1, wherein the first color sample has a resolution lower than that of the set of adapted luma samples, and is physically collocated with at least a subset of the adapted luma samples, and one of the set of adapted luma samples is selected as the adapted first luma sample to determine the first sample offset of the first color sample.

15. The method of claim 14, wherein the video bitstream further includes a fifth high-level syntax element for selecting the one of the set of adapted luma samples for determining the first sample offset of the first color sample in the CCSO mode, and the fifth high-level syntax element is signaled on a frame level or for a first color component corresponding to the first color sample.

16. The method of claim 14, wherein the set of adapted luma samples includes a left luma sample, a right luma sample, a bottom luma sample, and a right-bottom luma sample.

17. The method of claim 16, wherein the set of adapted luma samples further includes a left-top luma sample, a left luma sample, a left-bottom luma sample, a top luma sample, and a right-top luma sample.

18. The method of claim 14, wherein the set of adapted luma samples includes a left-top luma sample and a set of N neighboring luma samples surrounding the left-top luma sample, and the left-top luma sample shares a left top corner with the first color sample, and N is a positive integer.

19. The method of claim 1, wherein the video bitstream further includes a second high-level flag indicating whether a luma filter is applied in loop filtering, the method further comprising:
  in accordance with a determination that the second high-level flag indicates that the luma filter is applied in loop filtering, identifying a dual function index and determining the luma filter for generating the adapted luma samples from the reconstructed luma samples based on the dual function index; and
  in accordance with a determination that the second high-level flag indicates that the luma filter is not applied in loop filtering, identifying the dual function index and selecting one of the set of adapted luma samples for determining the first sample offset of the first color sample in the CCSO mode based on the dual function index.

20. The method of claim 1, determining the first sample offset of the first color sample further comprising:
  generating one or more quantized values based on the adapted neighboring luma samples and the adapted first luma sample; and
  classifying the first color sample based on the one or more quantized values to determine the first sample offset of the first color sample.

21. The method of claim 20, wherein generating the one or more quantized values further comprises:
  determining one or more difference values between the adapted neighboring luma samples and the adapted first luma sample, wherein the one or more difference values are quantized to generate the one or more quantized values.

22. A computing system, comprising:
control circuitry; and
memory storing one or more programs configured to be executed by the control circuitry, the one or more programs further comprising instructions for:
  receiving video data comprising a current image frame;
  encoding the current image frame;
  enabling a cross-component sample offset (CCSO) mode for generating a first sample offset of a first color sample of the current image frame based on one or more luma samples, wherein in the CCSO mode, the first sample offset of the first color sample is determined based on a set of adapted luma samples, which are further generated based on a set of reconstructed luma samples including a first luma sample that is collocated with the first color sample of the current image frame;
  transmitting the encoded current image frame via a video bitstream; and
  signaling, via the video bitstream, a first syntax element to indicate that the CCSO mode is applied to reconstruct the first color sample collocated with the first luma sample based on the first sample offset.

23. A non-transitory computer-readable storage medium storing one or more programs for execution by control circuitry of a computing system, the one or more programs comprising instructions for:
  obtaining a source video sequence including a current image frame; and
  performing a conversion between the source video sequence and a video bitstream, wherein the video bitstream comprises:
    the current image frame; and
    a first syntax element indicating whether to generate a first sample offset of a first color sample of the current image frame based on one or more luma samples for a cross-component sample offset (CCSO) mode;
  wherein the first sample offset of the first color sample is determined based on a set of adapted luma samples that are generated based on a first luma sample and one or more neighboring luma samples, and the first luma sample is collocated with the first color sample.

* * * * *